(12) United States Patent
Chen

(10) Patent No.: US 8,092,089 B2
(45) Date of Patent: Jan. 10, 2012

(54) AUXILIARY MOUNTING DEVICE FOR LINEAR RAILS

(75) Inventor: Hou-Yin Chen, Jhonghe (TW)

(73) Assignee: OME Technology Co., Ltd., Taipei County (TW)

( * ) Notice: Subject to any disclaimer, the term of this patent is extended or adjusted under 35 U.S.C. 154(b) by 423 days.

(21) Appl. No.: 12/457,189

(22) Filed: Jun. 3, 2009

(65) Prior Publication Data

US 2010/0142867 A1    Jun. 10, 2010

(30) Foreign Application Priority Data

Dec. 5, 2008    (TW) ................................ 97221789 U

(51) Int. Cl.
*F16C 29/06* (2006.01)
(52) U.S. Cl. ............................................ 384/45; 384/59
(58) Field of Classification Search .................... 384/43, 384/45, 49, 59
See application file for complete search history.

(56) References Cited

U.S. PATENT DOCUMENTS 7,445,386 B2 *  11/2008  Chen ............................ 384/45
7,670,053 B2 *   3/2010  Lin et al. ...................... 384/45

FOREIGN PATENT DOCUMENTS

JP      2002-106560    *   4/2002

* cited by examiner

*Primary Examiner* — William C Joyce
(74) *Attorney, Agent, or Firm* — Rosenberg, Klein & Lee

(57) ABSTRACT

An auxiliary mounting device for linear rails includes a connecting rail and a ball-filling rail. Both sides of the connecting rail each have a first auxiliary groove. The ball-filling rail is formed on one end of the connecting rail and has two swinging arms and a flap. The two swinging arms are extending from one end of the connecting rail. The two swinging arms each have a second auxiliary groove and a pivoting portion. The two second auxiliary grooves correspond to the two first auxiliary grooves respectively. The two pivoting portions are formed between the two swinging arms and the connecting rail. The flap is provided between the two swinging arms. The flap has two lateral edges and an inward-folding crease. The two lateral edges connect both sides of the flap to the two swinging arms. The inward-folding crease is formed in the middle of the flap.

7 Claims, 6 Drawing Sheets

AUXILIARY MOUNTING DEVICE FOR LINEAR RAILS

BACKGROUND OF THE INVENTION

1. Field of the Invention

The present invention relates to an auxiliary mounting device for linear rails, and in particular to an auxiliary device for filling balls in linear rails and mounting the rails.

2. Description of Related Art

Linear rails are widely used in machine tools or various measurement machines. Since the friction force generated by the movement of linear rails is small, even a small displacement can be performed accurately with low power consumption. Furthermore, the linear rail can be subjected to heat treatment, giving it further advantages, such as higher precision and mechanical properties as well as a long lifetime.

Since the linear rail is a precision tool, the installation must be performed carefully. During the installation, hefty collisions and vibrations should be avoided in order to prevent installation errors and the necessity for undesirable correction in a later stage.

In a conventional linear rail, it is inconvenient to fill the bearing balls and assemble the rails. Filling of the balls should be performed very carefully, since the space between a sliding block and the groove of the rail merely allows for one ball at a time to be received therein. After finishing the filling of balls, the sliding block is mounted on the rail correspondingly. However, such a mounting process is complex and time-consuming, which reduces the efficiency.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide an auxiliary mounting device for linear rails, whereby a user can fill balls between a sliding block and the rail easily so as to increase the mounting efficiency. Also, it is convenient for the user to mount the sliding block on the rail smoothly.

In order to achieve the above objects, the present invention provides an auxiliary mounting device for linear rails, which comprises: a connecting rail with each side having a first auxiliary groove; and a ball-filling rail formed on one end of the connecting rail, the ball-filling rail having two swinging arms and a flap, the two swinging arms extending from one end of the connecting rail, the two swinging arms each having a second auxiliary groove and a pivoting portion, the two second auxiliary grooves corresponding to the two first auxiliary grooves respectively, the two pivoting portions connecting the two swinging arms and one end of the connecting rail, the flap being provided between the distal ends of the two swinging arms, both sides of the flap being connected to the insides of the two swinging arms, the flap having two lateral edges and an inward-folding crease, the two lateral edges connecting both sides of the flap and the distal ends of the two swinging arms, and the inward-folding crease being formed in the middle of the flap. When the inward-folding crease is folded inwards and thereby the swinging arms are swung inwards, the ball-filling rail allows the balls to be filled between the sliding block and the rail, while the connecting rail keeps the sliding block mounted on the rail and prevents the balls from falling out.

The present invention has advantageous features as follows.

(I) When the flap is folded inwards, it drives the two swinging arms to swing inwards, thereby forming a pointed structure with a narrower front end. When the sliding block is disposed on the ball-filling rail, a larger opening will be formed between the groove of the sliding block and the second auxiliary groove of the swinging arm, whereby the user can fill the balls smoothly.

(II) When the connecting rail is connected to the rail and the filling of balls is completed, the sliding block can slide to the first auxiliary groove along the second auxiliary groove, and finally slides to the rail. In this way, the installation of linear rails can be completed easily.

(III) The ball-filling rail allows the user to fill the balls between the sliding block and the rail easily. Further, the connecting rail allows the user to assemble the sliding block with the rail smoothly. That is to say, the present invention has both effects of filling balls and mounting the rails, whereby the mounting efficiency can be increased.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF THE PREFERRED EMBODIMENTS

Please refer to FIGS. 1 to 8. The present invention provides an auxiliary mounting device for linear rails, which includes a connecting rail 1 and a ball-filling rail 2.

Figure 1:
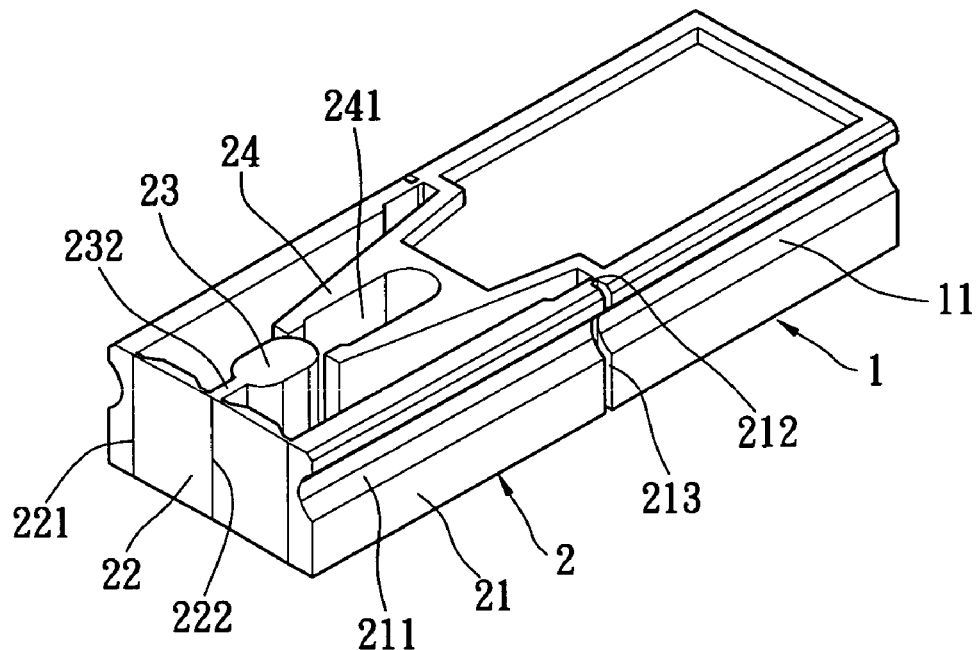
FIG. 1 is a perspective view showing the auxiliary mounting device for linear rails according to the present invention.
Figure 2:
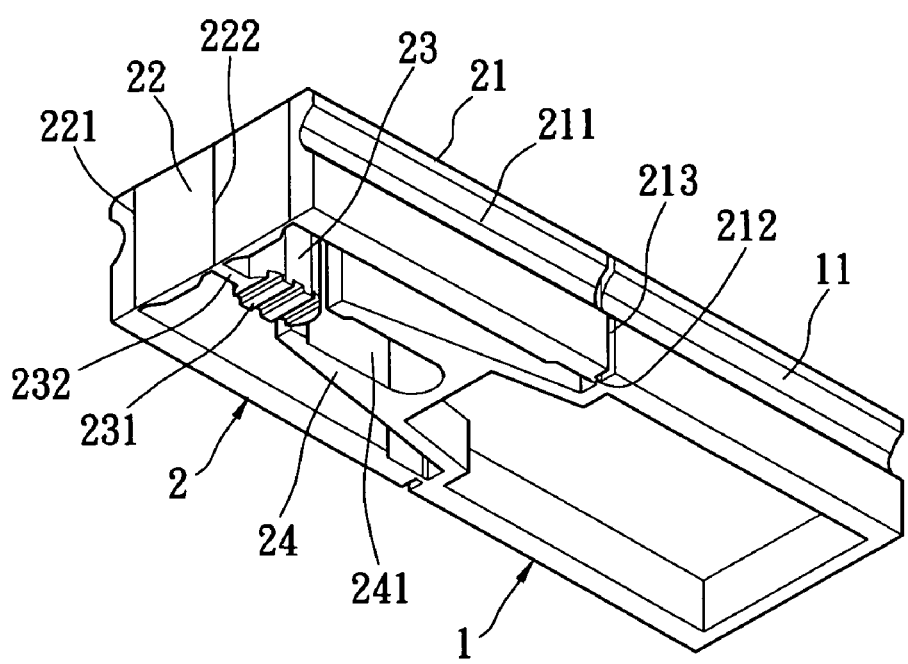
FIG. 2 is a perspective view of FIG. 1 in another viewing angle.

Please refer to FIGS. 1 and 2. The connecting rail 1 and the ball-filling rail 2 are made of polymeric materials. Both sides of the connecting rail 1 each have a first auxiliary groove 11, which is a curved groove with a profile corresponding to the curvature of a ball.

The ball-filling rail 2 has two swinging arms 21, a flap 22, an operating block 23 and two conic plates 24. The ball-filling rail 2 is integrally formed on one end of the connecting rail 1. The two swinging arms 21 are extending from one end of the connecting rail 1. The profile of the swinging arm 21 is that of an elongated plate. The outsides of the two swinging arms 21 each have a second auxiliary groove 211, which is a curved groove with a profile corresponding to the first auxiliary groove 11. The second auxiliary groove 211 is connected to the first auxiliary groove 11.

Figure 3:
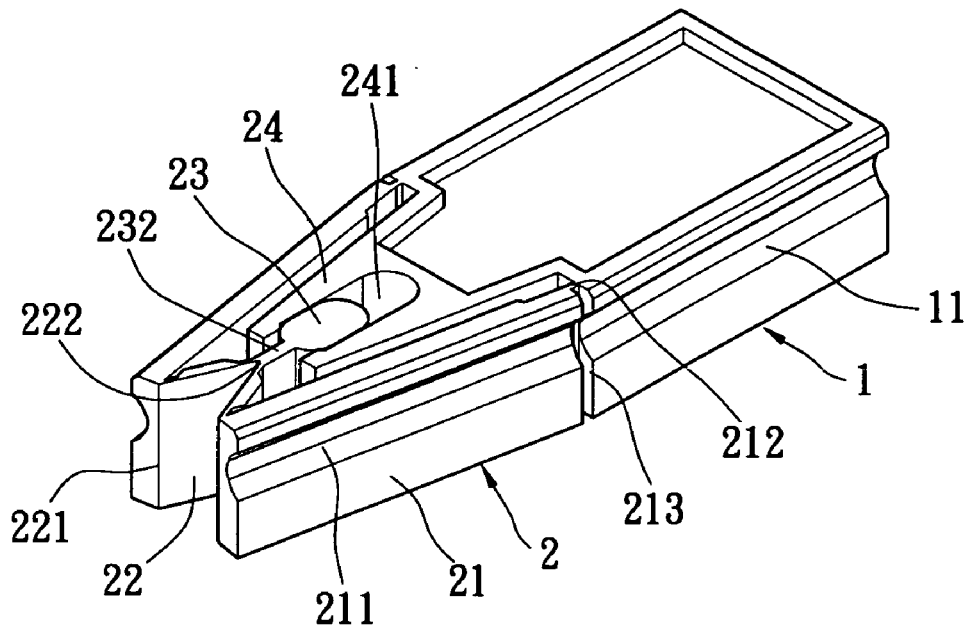
FIG. 3 is a schematic view showing the folded state of the auxiliary mounting device for linear rails according to the present invention.
Figure 4:
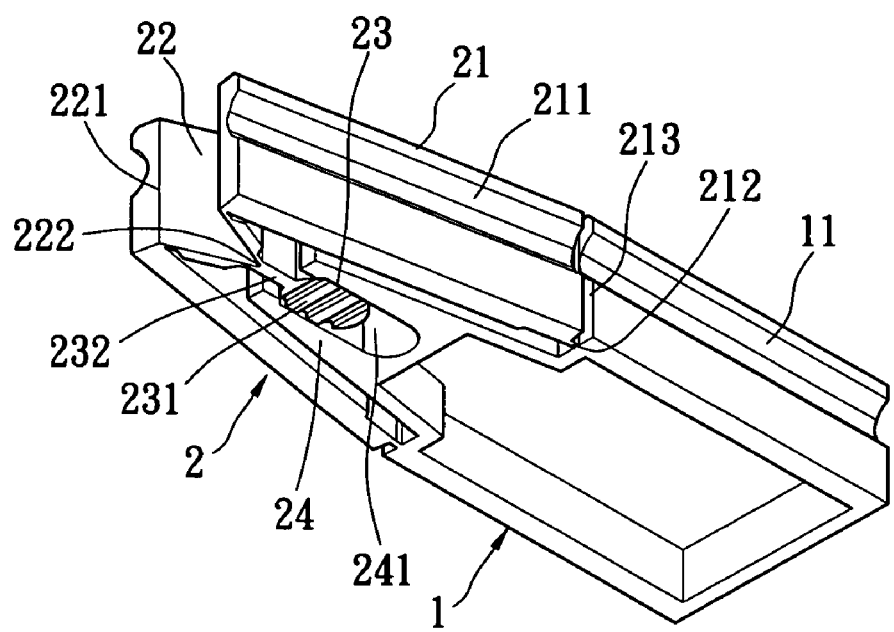
FIG. 4 is a perspective view of FIG. 3 in another viewing angle.

Please refer to FIGS. 3 and 4. The two swinging arms 21 each have a pivoting portion 212 connecting them at one end to the two connecting rails 1, respectively. Between one end of the swinging arm 21 and one end of the connecting rail 1 extends a straight side gap 213 along pivoting portion 212. Since the connecting rail 1 and the ball-filling rail 2 are made of polymeric materials, the pivoting portion 212 connecting the two can be bent several times without breaking due to the plasticity of polymeric materials. In other words, the swinging arms 21 can follow a swinging movement by using the pivoting portions as a fulcrum.

The flap 22 is provided between the distal ends of the two swinging arms 21. Both sides of the flap 22 are connected to the insides of the two swinging arms 21 respectively. The flap 22 has two lateral edges 221 and an inward-folding crease 222. Similar to the pivoting portion 212, the edges 221 and the inward-folding crease 222 can be bent several times without breaking. The two lateral edges 221 are connecting both sides of the flap 22 and the distal ends of the two swinging arms 21. The inward-folding crease 222 is formed in the middle of the flap 22.

The operating block 23 is provided inside the flap 22 and is extending from the inward-folding crease 222 towards the connecting rail 1. The operating block 23 has a plurality of ribs 231 and a connecting plate 232. The ribs 231 are formed on the lower surface of the operating block 23 and arranged in parallel to each other and transversely to the direction of movement of the operating block 23. The connecting plate 232 is used to connect the operating block 23 and the inward-folding crease 222 of the flap 22. The user can push the operating block 23 with his/her finger. The ribs 231 are used to provide a suitable friction force.

Therefore, when the operating block 23 moves along the longitudinal direction of the ball-filling rail 2, the operating block 23 can drive the flap 22, so that the flap 22 can be bent into a V shape formed by the two lateral edges 221 and the inward-folding crease 222 (FIG. 4).

The two conic plates 24 are provided between the two swinging arms 21 and are extending obliquely from one end of the connecting rail 1. A recess 241 is formed between the two conic plates 24 to correspond to the operating block 23. The two swinging arms 21 abut the two conic plates 24, so that the swinging range of the two swinging arms 21 can be restricted. In this way, the whole structure can be prevented from suffering damage. The recess 241 is an elongated curved groove corresponding to the operating block for receiving the operating block 23.

Please refer to FIGS. 3 and 4. When the user pushes the operating block 23 inwards with his/her finger into the recess 241, the operating block 23 drives the flap 22 to be folded into a V-shape. At this time, the two swinging arms 21 swing inwards to make the ball-filling rail 2 to form a pointed structure.

Please refer to FIGS. 5 to 8. The present invention is used as an auxiliary mounting device for linear rails. Generally, the linear rail comprises a sliding block 3 and a rail 4. The sliding block 3 comprises a sliding seat 31 and two caps 32. The inside of the sliding seat 31 has two grooves 311. Both sides of the rail 4 each have a rail groove 41. The two grooves 311 and the rail groove 41 are curved grooves with a profile corresponding to the first auxiliary groove 11 and the second auxiliary groove 311. The groove 311 and the first auxiliary groove 11 (or the second auxiliary groove 211) can form a channel for allowing balls to roll therein.

Figure 5:
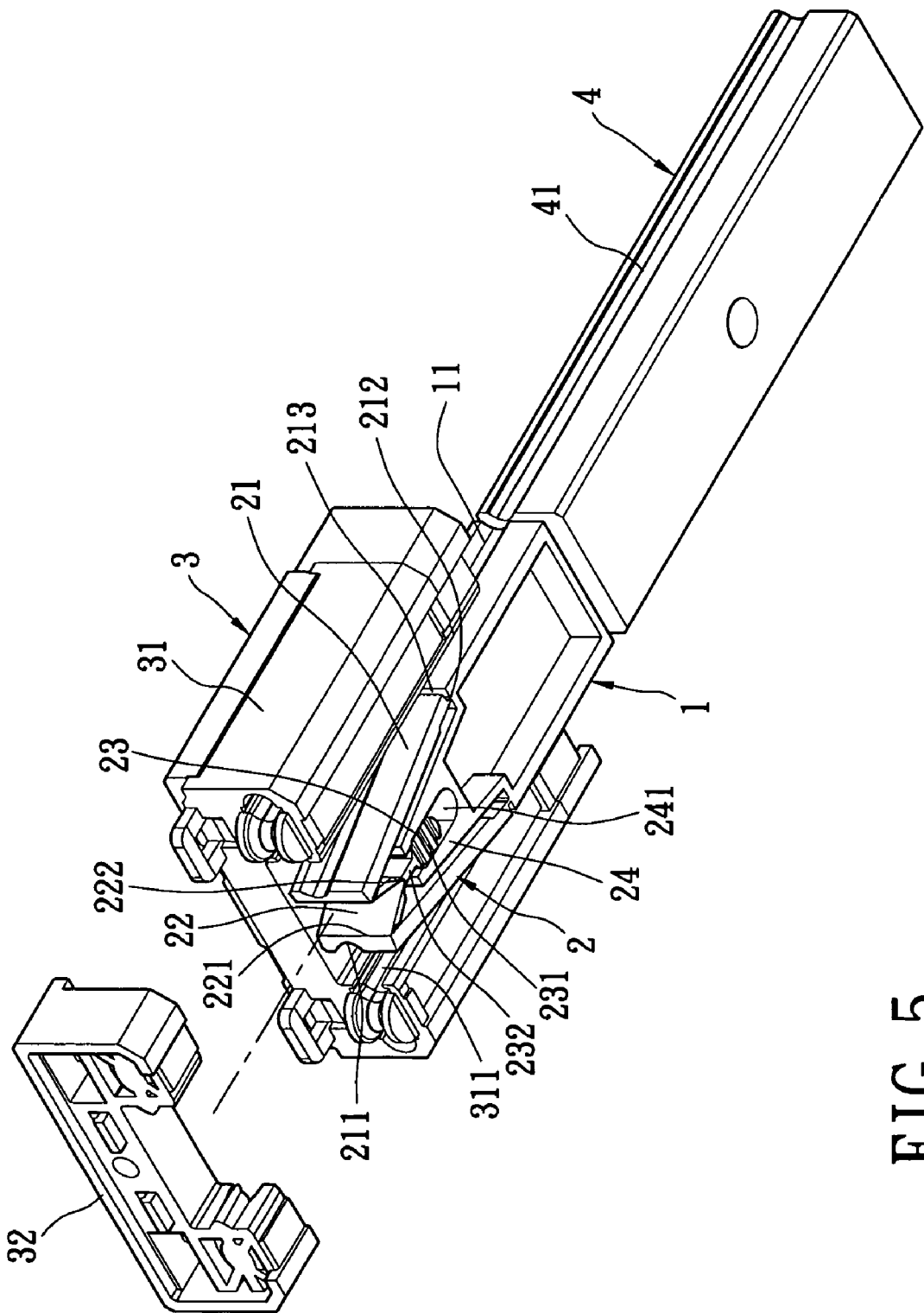
FIG. 5 is a schematic view (I) showing a sliding block being mounted on a rail via the present invention.

Please refer to FIG. 5. When the user intends to fill balls in the sliding block 3 and then mount the sliding block 3 on the rail 4, first, the user has to dispose the sliding block 3 on the ball-filling rail 2, and pushes the operating block 23 inwards to cause the two swinging arms 21 to swing inwards, thereby forming a pointed structure. At this time, the second auxiliary groove 211 of the ball-filling rail 2 and the groove 311 of the sliding seat 31 form an opening of a larger pitch, which allow balls to be filled in the sliding block 3 easily and smoothly.

Figure 6:
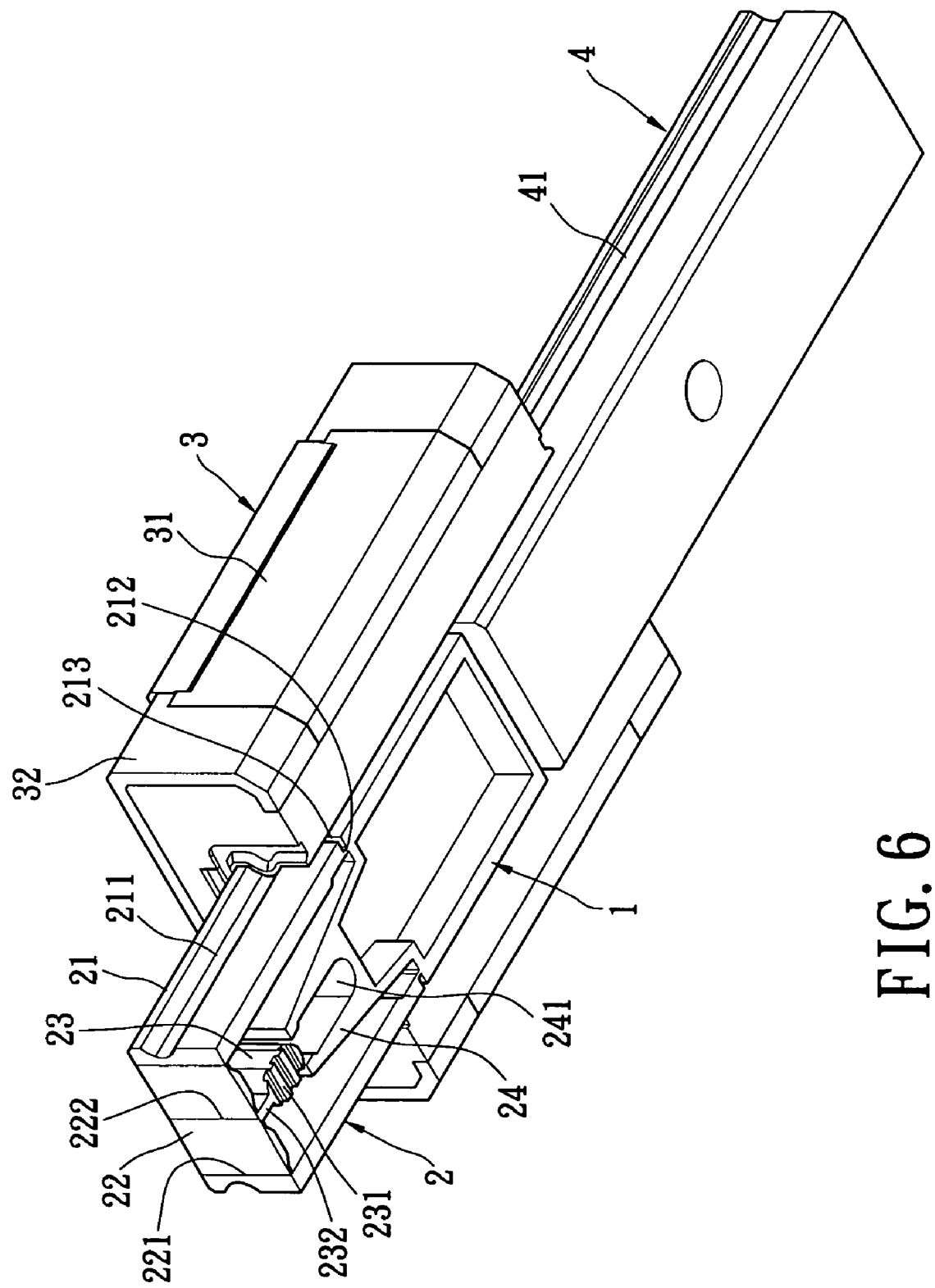
FIG. 6 is a schematic view (II) showing a sliding block being mounted on a rail via the present invention.

Please refer to FIG. 6. After the user finishes the filling of balls, the user can cover the cap 32 on the sliding seat 31. Then, the user connects the other end of the connecting rail 1 to one end of the rail 4 with the sliding block 3 moving to the rail groove 41 of the rail 4 along the second auxiliary groove 211 and the first auxiliary groove 11 of the connecting rail 1.

Figure 7:
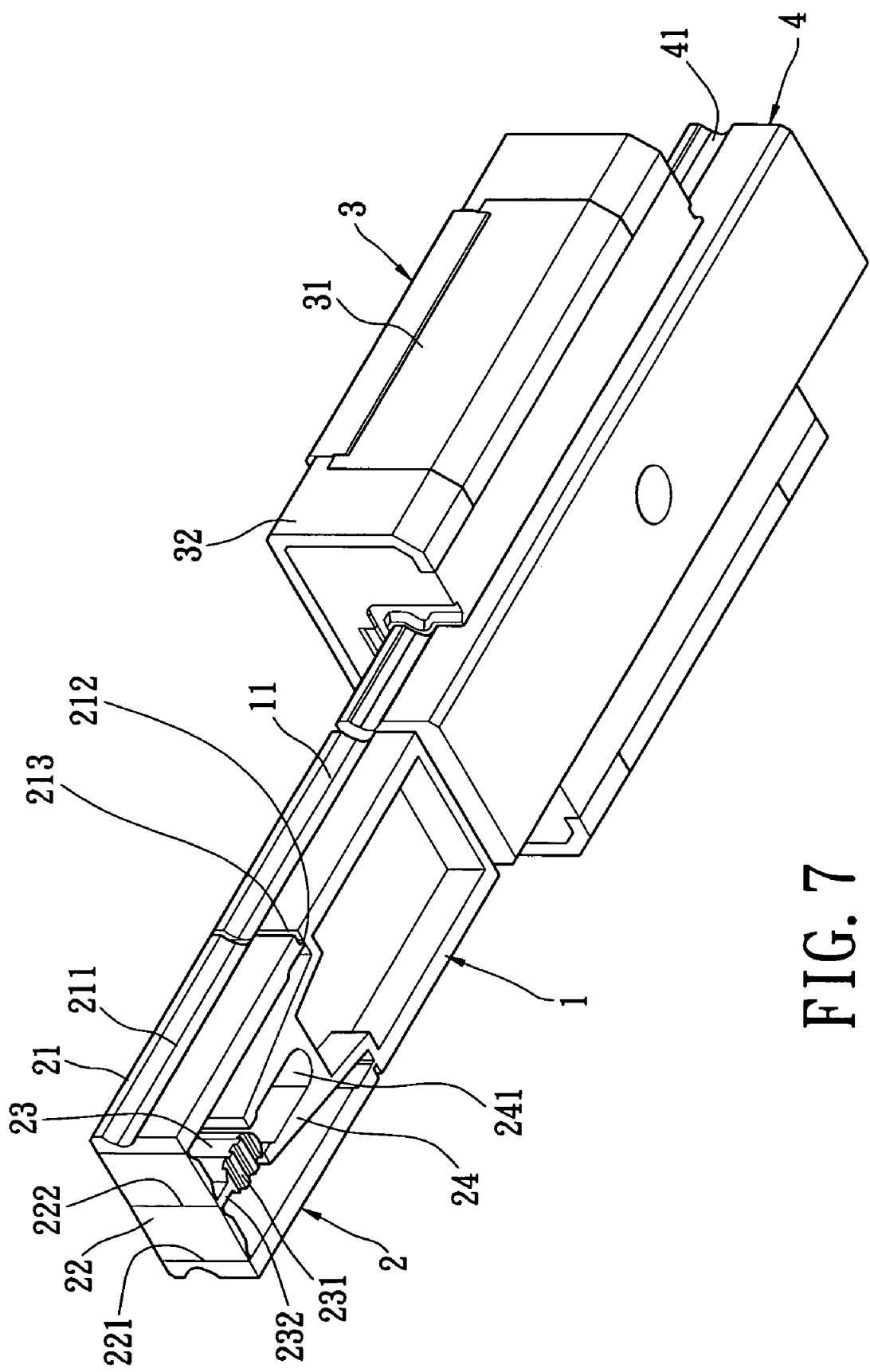
FIG. 7 is a schematic view (III) showing a sliding block being mounted on a rail via the present invention.
Figure 8:
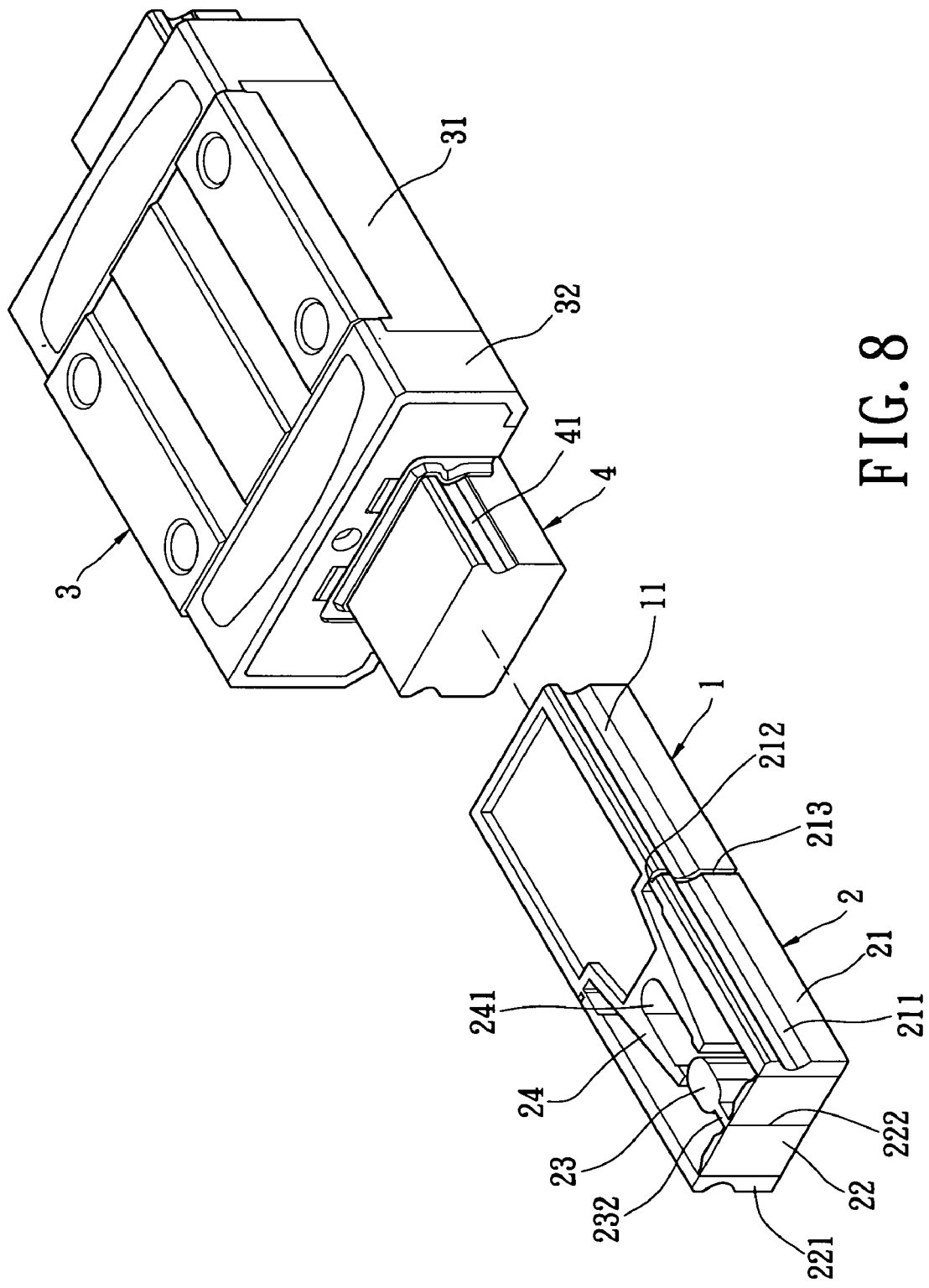
FIG. 8 is a schematic view (IV) showing a sliding block being mounted on a rail via the present invention.

Please refer to FIGS. 7 and 8. Via the above process, the user can detach the connecting rail 1 from one end of the rail 4. At this time, the sliding block 3 has been completely mounted on the rail 4, so that the expected reciprocating movement can be generated accurately.

The present invention has advantageous features as follows.

(I) When the flap 22 is folded inwards, it also drives the two swinging arms 21 to swing inwards, so that a pointed structure with a narrower front end can be formed. When the sliding block 3 is disposed on the ball-filling rail 2, a larger opening will be formed between the groove 311 of the sliding block 3 and the second auxiliary groove 211 of the swinging arm 21, whereby the user can fill the balls smoothly.

(II) When the connecting rail 1 is connected to the rail 4, and the filling of balls in the sliding block 3 is completed, the sliding block 3 can slide to the first auxiliary groove 11 along the second auxiliary groove 211 and finally slide to the rail 4. In this way, the installation of a linear rail can be accomplished easily.

(III) The ball-filling rail 2 allows the user to fill the balls between the sliding block 3 and the rail 4 easily. Further, the connecting rail 1 allows the user to assemble the sliding block 3 with the rail 4 smoothly. That is to say, the present invention has both effects of filling balls and mounting the rail 4, whereby the mounting efficiency can be increased.

While the present invention has been described in terms of what is presently considered the most practical and preferred embodiment, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An auxiliary mounting device for linear rails, comprising:
   a connecting rail with each side having a first auxiliary groove; and
   a ball-filling rail formed on one end of the connecting rail, the ball-filling rail having two swinging arms and a flap, the two swinging arms extending from one end of the connecting rail, the two swinging arms each having a second auxiliary groove and a pivoting portion, the two second auxiliary grooves corresponding to the two first auxiliary grooves respectively, the two pivoting portions connecting the two swinging arms and one end of the connecting rail, the flap being provided between the distal ends of the two swinging arms, both sides of the flap being connected to the insides of the two swinging arms, the flap having two lateral edges and an inward-folding crease, the two lateral edges connecting both sides of the flap and the distal ends of the two swinging arms, the inward-folding crease being formed in the middle of the flap, whereby the ball-filling rail allows balls to be mounted between the sliding block and the rail, and the connecting rail keeps the sliding block mounted on the rail, thus preventing balls from falling out.

2. The auxiliary mounting device for linear rails according to claim 1, wherein the ball-filling rail has an operating block, the operating block is provided inside the flap and is extending from the inward-folding crease towards the connecting rail.

3. The auxiliary mounting device for linear rails according to claim 2, wherein the operating block has a connecting plate connecting the operating block and the inward-folding crease of the flap.

4. The auxiliary mounting device for linear rails according to claim 3, wherein the operating block has a plurality of ribs, and the ribs are arranged on the lower surface of the operating block.

5. The auxiliary mounting device for linear rails according to claim 1, wherein a side gap is formed between the swinging arm and one end of the connecting rail.

6. The auxiliary mounting device for linear rails according to claim 1, wherein the ball-filling rail has two conic plates, the two conic plates are provided between the two swinging arms and extend obliquely from one end of the connecting rail.

7. The auxiliary mounting device for linear rails according to claim 6, wherein a recess is formed between the two conic plates to correspond to the operating block.

* * * * *